(12) United States Patent
Sonerud

(10) Patent No.: US 8,087,701 B2
(45) Date of Patent: Jan. 3, 2012

(54) HYDRAULIC COUPLING DEVICE

(75) Inventor: Åke Sonerud, Hudiksvall (SE)

(73) Assignee: Oilquick AB, Hudiksvall (SE)

( * ) Notice: Subject to any disclaimer, the term of this patent is extended or adjusted under 35 U.S.C. 154(b) by 0 days.

(21) Appl. No.: 12/209,915

(22) Filed: Sep. 12, 2008

(65) Prior Publication Data

US 2009/0058075 A1    Mar. 5, 2009

Related U.S. Application Data

(63) Continuation of application No. PCT/SE2007/050161, filed on Mar. 15, 2007.

(30) Foreign Application Priority Data

Mar. 16, 2006 (SE) ...................... 0600591

(51) Int. Cl.
F16L 39/00 (2006.01)
(52) U.S. Cl. ...................... 285/124.5; 411/435
(58) Field of Classification Search ............... 285/120.1, 285/124.1–124.5, 149.1, 293.1, 901, 212, 285/205, 206, 207, 208; 411/435; 138/96 R, 138/96 T See application file for complete search history.

(56) References Cited

U.S. PATENT DOCUMENTS

| | | | | |
|---|---|---|---|---|
| 727,010 A * | 5/1903 | Smith | ............................ | 118/505 |
| 910,128 A * | 1/1909 | Hammer | ....................... | 215/337 |
| 1,116,241 A * | 11/1914 | Carlson | ......................... | 411/437 |
| 1,172,427 A * | 2/1916 | Carlson | ......................... | 411/437 |
| 1,329,984 A * | 2/1920 | McIlroy | ....................... | 138/96 R |
| 1,577,413 A * | 3/1926 | Volk, Jr. | ......................... | 174/81 |
| 1,692,710 A * | 11/1928 | Spahn | ........................... | 220/288 |
| 1,775,128 A * | 9/1930 | Hunter | ......................... | 285/207 |
| 1,860,800 A * | 5/1932 | Borden | ...................... | 285/149.1 |
| 1,879,920 A * | 9/1932 | Church | ......................... | 285/206 |
| 1,882,278 A * | 10/1932 | Francyk | ........................ | 215/329 |
| 2,223,202 A * | 11/1940 | Bergan | .......................... | 411/428 |
| 2,281,882 A * | 5/1942 | Kinsman | ........................ | 285/206 |
| 2,301,786 A * | 11/1942 | Millermaster | ................... | 174/51 |
| 2,445,358 A * | 7/1948 | Maechtlen et al. | ......... | 285/149.1 |
| 2,481,142 A * | 9/1949 | Mueller et al. | ................ | 285/212 |
| 2,580,818 A * | 1/1952 | Mundy et al. | ................... | 285/40 |
| 2,930,409 A * | 3/1960 | Higgins | ....................... | 138/96 T |
| 3,004,776 A * | 10/1961 | Sebardt | ............................. | 285/3 |
| 3,052,748 A * | 9/1962 | Curtiss | ............................ | 174/51 |
| 3,104,120 A * | 9/1963 | Ahlport et al. | ............. | 285/154.1 |
| 3,177,014 A * | 4/1965 | Bergstrom | ..................... | 285/206 |
| 3,642,252 A * | 2/1972 | Phillips | ......................... | 251/145 |

(Continued)

OTHER PUBLICATIONS

International Search Report and Written Opinion, 8 pages (Jun. 7, 2007).

*Primary Examiner* — Aaron Dunwoody
(74) *Attorney, Agent, or Firm* — The Maxham Firm

(57) ABSTRACT

A hydraulic coupling device, comprising a coupling unit, a holder block, and a lock nut. The coupling unit is mounted to the holder block by means of the lock nut, which is tightened in a thread at the nose end of the coupling unit. The lock nut has a rotationally symmetrical outer contour. A plurality of grooves distributed around the circumference are recessed in the outer contour. The grooves extend axially inward from the end of the lock nut facing away from the holder block. The invention also relates to a lock nut for a hydraulic coupling device.

6 Claims, 3 Drawing Sheets

U.S. PATENT DOCUMENTS

| | | | | |
|---|---|---|---|---|
| 3,929,152 A | * | 12/1975 | Graham | 137/296 |
| 4,022,262 A | * | 5/1977 | Gunn | 411/302 |
| 4,139,005 A | * | 2/1979 | Dickey | 138/89 |
| 4,278,227 A | * | 7/1981 | Davis et al. | 248/487 |
| D262,940 S | * | 2/1982 | Spinner | D8/397 |
| 4,367,060 A | * | 1/1983 | Berecz | 411/303 |
| 4,411,458 A | | 10/1983 | Strunk et al. | |
| 4,417,890 A | * | 11/1983 | Dennehey et al. | 604/256 |
| D273,561 S | * | 4/1984 | Ozaki et al. | D8/397 |
| 4,606,562 A | * | 8/1986 | Saraceno | 285/149.1 |
| 4,613,169 A | | 9/1986 | Engelhart | |
| 5,104,273 A | * | 4/1992 | Clark | 411/85 |
| 5,383,495 A | * | 1/1995 | Kennedy | 138/89 |
| 5,678,866 A | * | 10/1997 | Mina | 174/153 A |
| 5,704,656 A | * | 1/1998 | Rowe | 285/93 |
| 5,881,773 A | * | 3/1999 | Lukas et al. | 137/884 |
| 5,899,234 A | * | 5/1999 | Senninger | 138/89 |
| 5,971,444 A | * | 10/1999 | Hawkins | 285/206 |
| D420,107 S | * | 2/2000 | Kinder | D23/262 |
| 6,064,346 A | | 5/2000 | Blom | |
| 6,193,284 B1 | * | 2/2001 | King | 285/139.2 |
| 6,196,595 B1 | | 3/2001 | Sonerud | |
| 6,209,929 B1 | * | 4/2001 | Ikegami et al. | 285/139.2 |
| 6,324,962 B1 | * | 12/2001 | Majkrzak | 92/163 |
| 6,348,900 B1 | | 2/2002 | Blom | |
| 6,516,741 B1 | * | 2/2003 | Sorum et al. | 116/137 R |
| 6,715,803 B1 | * | 4/2004 | Pahl | 285/404 |
| 7,073,825 B2 | * | 7/2006 | Takada et al. | 285/124.1 |
| 7,121,589 B2 | * | 10/2006 | Hawkinson et al. | 285/139.2 |
| D561,019 S | * | 2/2008 | Riedel et al. | D8/397 |
| D568,149 S | * | 5/2008 | Riedel | D8/397 |
| 7,568,874 B2 | * | 8/2009 | Riedel et al. | 411/435 |
| 7,597,117 B1 | * | 10/2009 | Groso et al. | 138/89 |
| 7,597,361 B2 | * | 10/2009 | Theilen | 285/206 |
| 2001/0032747 A1 | * | 10/2001 | DePoy et al. | 180/314 |
| 2003/0173273 A1 | * | 9/2003 | Giordano et al. | 210/87 |
| 2005/0098485 A1 | * | 5/2005 | Boyd et al. | 210/87 |
| 2007/0292237 A1 | * | 12/2007 | Riedel et al. | 411/435 |
| 2009/0257845 A1 | * | 10/2009 | Riedel et al. | 411/435 |

* cited by examiner

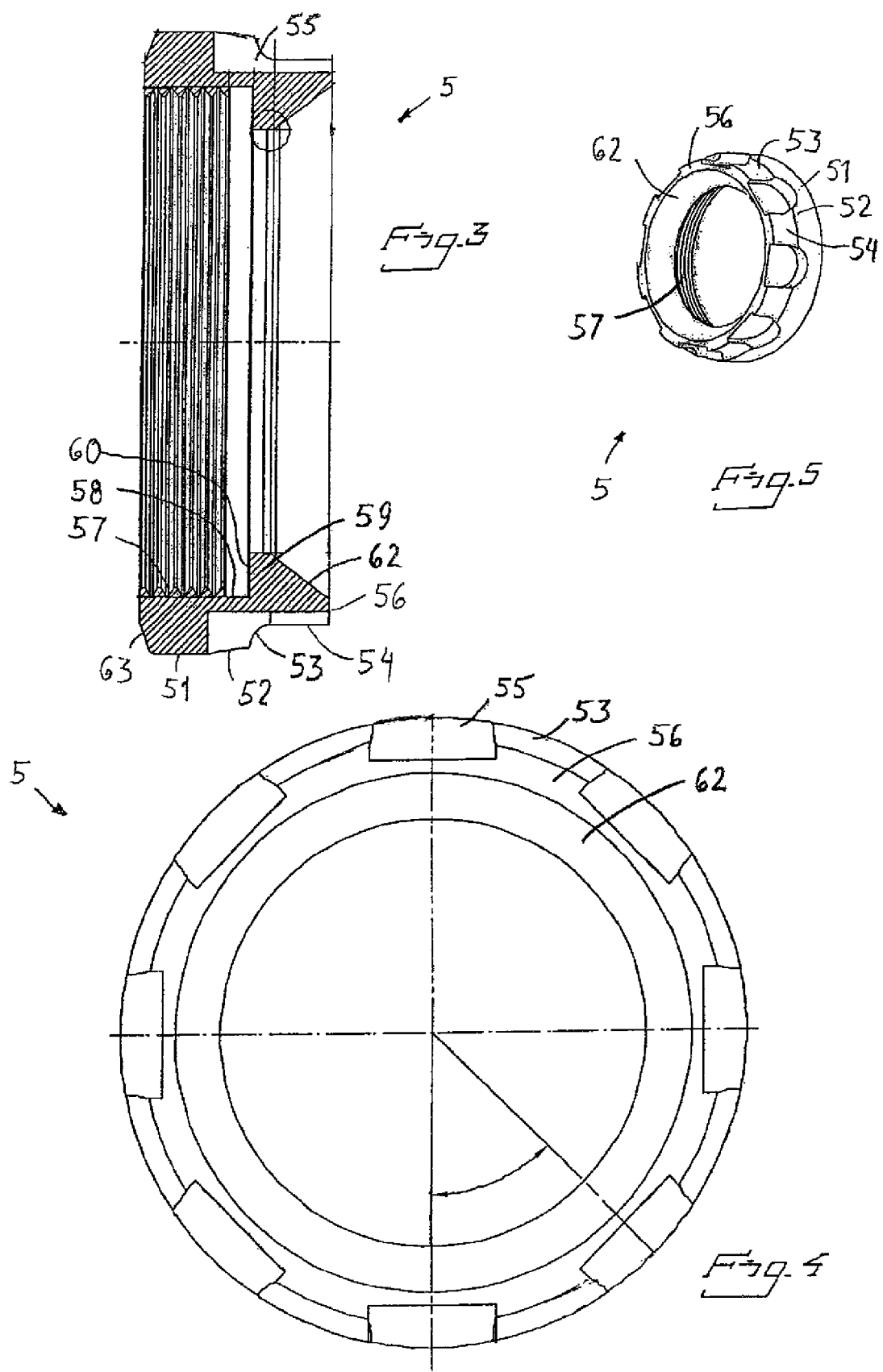

HYDRAULIC COUPLING DEVICE

FIELD OF THE INVENTION

In a first aspect, the present invention relates to a hydraulic coupling device comprising a coupling unit, a holder block to which the coupling unit is mounted, and a lock nut for securing the coupling unit to the holder block, which coupling unit has a hose-connection end for the connection to a hydraulic hose, and a nose end for the interconnection with a complementary coupling unit, which nose end is provided with an external thread for the co-operation with the lock nut, so that the lock nut, in the mounted position, secures the coupling unit in the holder block.

In a second aspect, the invention relates to a lock nut for use in the invented hydraulic coupling device.

In a third aspect, the invention relates to a mounting tool for mounting a hydraulic coupling unit to a holder block in the invented hydraulic coupling unit.

In a fourth aspect, the invention relates to a method for mounting a hydraulic coupling unit to a holder block, wherein the hydraulic coupling unit is inserted into a through hole in the holder block from the side on which the hydraulic coupling unit is intended to be connected to a hose, and a lock ring is screwed onto the hydraulic coupling unit at an opposite side of the holder block.

BACKGROUND OF THE INVENTION

Working machines, such as excavators and the like, are often designed to be able to work with different types of tools. Change from one tool to another involves different types of connections, mechanic, hydraulic and electric. Usually, the operation of the tools is essentially hydraulic. In order to facilitate change of tools, it is since long previously known with different types of quick-coupling systems for the hydraulics. These may be automatic to different extents, and it is desirable that switching can be effected without the operator unnecessarily needing to leave the driver's cab.

In connection with semi-manual or fully automatic multi-coupling systems for the interconnection of a plurality of hydraulic hoses, it is important that one of the coupling units is safely and firmly fastened together with the attaching element thereof such as a holder block. In such multi-coupling systems, the principle of function is that one of the coupling units is fixedly assembled with a holder block and the other coupling unit is flexibly attached in the attaching element thereof so as to be able to absorb play and manufacturing tolerances of the system. The coupling units consist of a female coupling unit and a male coupling unit. Usually, but not always, it is the female coupling unit that is fixedly mounted and the male coupling unit flexibly. It is important to secure a proper attachment of the fixed coupling unit. The development of the hydraulic field moves fast toward higher working pressure, which implies increased separation forces between the coupling units and thereby greater stresses on their attachment. Increased use of tools in the form of steel scissors, hydraulic hammers, vibrator carriages, screening buckets, etc., gives pulsations in the hydraulic system of the tool carrier, which also makes great demands on the attachments of the coupling units.

Another problem that often occurs is that it is narrow and lack of space between the different couplings. This is because there is a continuously increased demand of more functions and higher oil flows, which in turn means desires of larger coupling dimensions, etc. The space and room for mounting tools in connection with mounting and dismounting of couplings and hose connections is another limiting factor.

The fixedly mounted coupling unit—in the following called the female coupling unit, since usually, it is this that is fixedly mounted—is normally installed in the holder block in a hole in the same, the hose-connection end of the coupling unit being situated on one side of the holder block and the nose end thereof, i.e., the end to be interconnected with a male coupling unit, is situated on the opposite end of the holder block.

In that connection, there are different alternatives for the installation of the female coupling unit into the holder block.

A first possibility is to mount the coupling unit in place by means of circlip at the nose end thereof. The advantage of this method is that it is inexpensive and that the coupling is easy to mount. An additional advantage is that it is mounted from behind, i.e., the coupling unit is inserted into the hole of the holder block from the hose-connection side, which allows premounting of connection couplings, elbow couplings or hydraulic hoses before the installation. The problem here is that the joint does not become entirely free of play, which results in wear and possible fracture of the circlip in the case of pulsations and high-pressure surges. Has clear limitations at large separation forces in the hydraulic system.

Another alternative is that the coupling unit is screw-mounted from behind. This may be done by the fact that each coupling unit is individually tightened or that a plurality of coupling units are collectively tightened by means of a fixing plate that is connected in the holder block. These two attachments provide a stable joint that resists pulsations and vibrations well. The disadvantage is that it is hard to gain access in repair mounting out in the field. Furthermore, in the case of individual mounting, it is often too little space to get a sufficient dimension of the attachment. The latter problem is avoided in the case of collective attachment, but here, on the other hand, major problems occur when changing only one coupling.

A third method is to attach the coupling unit in a screw-mounted fashion by a lock nut in the nose end. This is a good method since it provides a joint that is stable and free of play and resists pulsations and vibrations well. Properly dimensioned, it also provides a strong joint that resists large separation forces in the hydraulic system. An additional advantage is that the coupling is mounted from behind, which allows premounting of elbow couplings, pipe joints or hydraulic hoses before the installation. The disadvantage is that this method requires a relatively large space to have room for a properly dimensioned lock nut and mounting tools in order to mount/dismount the coupling.

The hydraulic coupling device according to the present invention is of the type that corresponds to the last-mentioned alternative.

A purpose of the present invention is to overcome the disadvantages associated with such a hydraulic coupling device.

SUMMARY OF THE INVENTION

In accordance with the first aspect of the invention, this purpose is attained by the fact that a hydraulic coupling device of the type in question has the special features that the lock nut has a rotationally symmetrical outer contour, in which outer contour a plurality of grooves distributed around the circumference are recessed, which grooves extend axially inward from the end of the lock nut facing away from the holder block.

Thanks to the axial grooves, the lock nut can be turned without any appreciable space in the radial direction being required, where the grooves can be utilized for a uniform application of the torque.

Thus, by the invented device, the disadvantages associated with previously known attachments, based on the principle of a lock nut at the nose end, have been eliminated.

The construction provides a secure joint free of play, which can be used in connection with pulsating and vibrating hydraulic tools. The construction is solid and prevents parts from coming loose. The device can resist very high pressure peaks, up to 1200 bar. The mounting from the front allows the advantage to pre-mount couplings and hydraulic hoses in the rear end of the coupling device before mounting the coupling unit. Each coupling unit becomes individually attached, which entails optimized service friendliness.

The rotationally symmetrical contour may advantageously be cylindrical.

According to a preferred embodiment of the invented hydraulic coupling unit, the axial extension of each groove is smaller than the total axial extension of the lock nut.

Closest to the holder block, the lock nut will thereby have a portion that is continuously rotationally symmetrical, for instance cylindrical. Thereby, the portion of the lock nut may be made thinner than what otherwise would be required from a strength point-of-view. A further adaptation to the little space available is thereby attained. The outer part of the lock nut does not fulfill the same function of securing the joint as the inner one, and hence the strength-reducing effect of the grooves does not constitute any problem. Since the grooves are situated on the axially outer portion of the lock nut, there, the scarcity of space is not as marked as closer to the holder block, which makes it easier to apply torque.

According to an additional preferred embodiment, the grooves have an axial extension that amounts to 50-70% of the axial extension of the lock nut.

In this interval, the optimal balancing is found so as to achieve the high-strength function of the joint as well as a sufficient engagement for applying torque and a sufficiently great distance from the holder block in order to create the requisite space.

According to an additional preferred embodiment, the lock nut has a thread portion that axially extends from the end of the lock nut facing the holder block and comprises 30-60% of the axial extension of the lock nut.

Thereby, a corresponding portion of the lock nut will be subjected to the strength requirements imposed by the joint, while the remaining part of the nut may be optimized for torque application.

According to an additional preferred embodiment, the number of grooves is 4 to 10. The optimal balancing of the number of grooves in view of manufacturing aspects as well as strength aspects is found within this interval. Most suitable will be 6 or 8 grooves.

According to an additional preferred embodiment, the coupling unit is a female coupling unit and the hole of the lock nut has a hole portion at the end of the lock nut facing away from the holder block, which portion has a decreasing diameter from the end and inward, the wall of the hole in said portion forming a guide surface for a complementary male coupling unit.

For the interconnection of the male and female coupling units, guiding-in is required so that the units are centered for proper interconnection. This is effected most simply by arranging a guiding-in device in connection with the female coupling part that guides in the flexibly mounted mate coupling part to become centered. Conventionally, this is done by arranging a special plate having a guiding-in opening with inclined opening walls. By providing, as in accordance with this preferred embodiment of the invention, an inclined guide surface in the lock nut, the guiding-in function is integrated in the lock nut so that the need for a special guiding-in plate is eliminated. This simplifies the manufacture and provides greater operation reliability thanks to fewer components.

According to an additional preferred embodiment, the guide surface has a conical shape.

A conical shape allows an efficient guiding-in in a simple way and is more inexpensive in manufacturing cost than, e.g., a decreasing diameter with a guide surface having a profile as a curved curve.

According to an additional preferred embodiment, the guide surface forms an angle with the axial direction in the interval of 30-50°, preferably in the interval of 35-45°.

The optimal angle for a quick and secure guiding-in of the male coupling unit to become centered is found within this area.

In a second aspect of the invention, the purpose set forth has been attained by the fact that a lock nut for use in a hydraulic coupling device has the special features that the lock nut has a rotationally symmetrical outer contour, in which outer contour a plurality of axial grooves distributed around the circumference are recessed.

When used in the device in question, the invented lock nut brings the corresponding advantages that are gained with the invented device and that have been accounted for above.

According to preferred embodiments of the invented lock nut, it has the corresponding features that have been given for the lock nut of preferred embodiments of the invented hydraulic coupling device. In that connection, the corresponding advantages that have been indicated above are gained.

According to the third aspect of the invention, upon mounting of the hydraulic coupling unit, the invented mounting tool is arranged to turn the lock nut comprised in the hydraulic coupling device, the mounting tool being formed as a ring that on the inside is provided with radially directed and axially running protuberances arranged for engagement in the axial grooves of the lock nut, and which ring, on the outside, has means arranged to allow turning of the ring by a torque wrench.

By means of the invented mounting tool, the hydraulic coupling device according to the invention can be mounted in a simple way.

Finally, in the fourth aspect of the invention, the purpose set forth has been attained by the fact that a mounting method of the kind in question comprises the special measures that the lock nut is screwed on by means of a ring-shaped tool, which axially is threaded onto and surrounds a portion of the lock nut, the lock ring being provided with axially directed grooves and the tool being provided with axially directed complementary protuberances to allow a rotationally fixed engagement between the lock nut and the tool, and that the tool is turned by a torque tool.

According to preferred embodiments of the invented method, it is exercised in order to mount a hydraulic coupling device according to the invention or any of the preferred embodiments of the same.

Thereby, there are gained the corresponding advantages that are attained by the invented hydraulic coupling devices and the preferred embodiments thereof and that have been accounted for above.

BRIEF DESCRIPTION OF THE DRAWING

The invention is more fully explained by the following detailed descriptions of advantageous embodiments of the same, reference being made to the appended drawing figures, in which:

FIG. 3 is an axial section through a lock nut according to the invention;

FIG. 4 is an enlarged end view from the right of the lock nut of FIG. 3;

FIG. 5 is a perspective view of the lock nut of FIGS. 3 and 4;

DETAILED DESCRIPTION OF THE PREFERRED EMBODIMENTS

Figure 1:
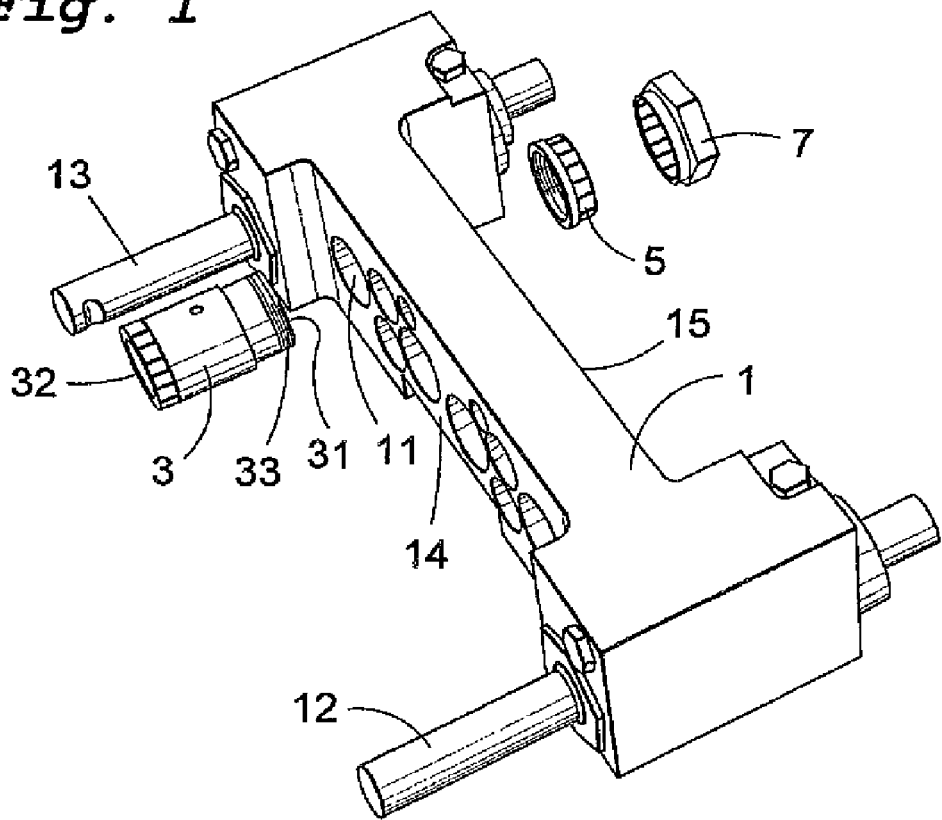
FIG. 1 is a perspective view of included components of a hydraulic coupling device according to the invention.

As FIG. 1 illustrates in a perspective view the included components of the invention, with a holder block 1, a hydraulic coupling unit 3 of the female type, a lock nut 5, and a mounting tool 7.

The holder block 1 is mounted on a tool attachment of a working machine, the holder block being displaceable on two guide bars 12, 13. When a tool is to be coupled to the tool attachment, a mechanical connection is effected as well as a connection of hydraulic pipes from the working machine to the tool. In doing so, hydraulic coupling units on the holder block 1 are brought to be interconnected with the corresponding coupling units on the tool by the fact that the holder block 1 is displaced by hydraulic control along the guides 12, 13.

The holder block is provided with a plurality of holes 11 in which the hydraulic coupling units are mounted. The left side of the holder part to the left in the figure is henceforth denominated the back side 14 thereof and the opposite side the front side 15 thereof. The hydraulic hose connection is arranged at the back side 14 while the front side is arranged for connection to the coupling units of the working tool.

The female coupling unit 3 is mounted in the holder block 1 by being inserted into one of the holes 11 thereof from the back side. At the nose end 31 thereof, the coupling unit 3 is provided with threads 33. When the coupling unit 3 is placed in the hole 11, the nose end 31 thereof having the thread reaches up to the front side 15 of the holder block 1. A lock nut 5 is screwed onto the thread 33 of the coupling unit 3 by means of the mounting tool 7. At the opposite end 32 of the coupling unit 3, the hydraulic hose is connected.

Figure 2:
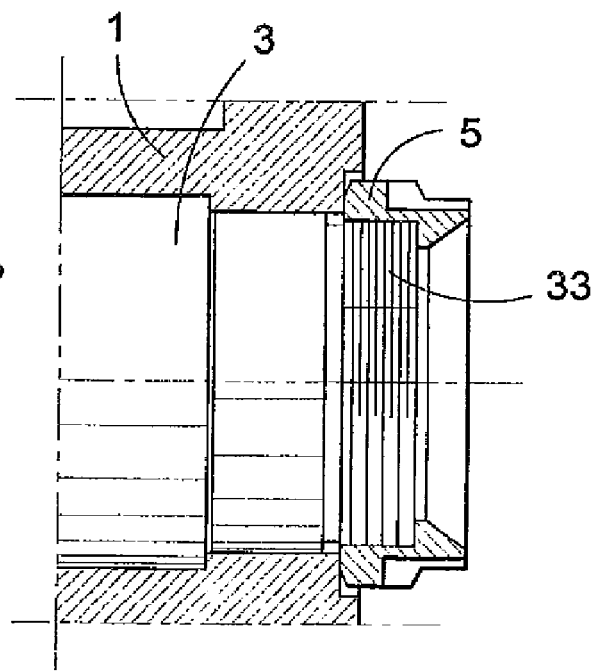
FIG. 2 is an axial section through a part of a hydraulic coupling device according to the invention.

FIG. 2 shows the coupling unit 3 fixedly mounted in the holder block 1 by means of the lock nut 5 tightened on the thread 33 of the coupling unit 3.

In FIGS. 3-5, there is seen in more detail how the lock nut 5 is designed. The outer profile of the lock nut has a first segment 51 that is entirely cylindrical, and then a slightly conical, outwardly tapering segment 52 follows. Outermost, there is an additional cylindrical segment 54. Between the conical segment 52 and the cylindrical segment 54, there is a transition segment 53 having a circular-arc-shaped profile.

Furthermore, on the outside, the lock nut 5 is provided with eight axially directed grooves 55, which mouth in the outer end surface 56 of the lock nut. Each groove 55 has a width that approximately corresponds to the distance between two adjacent grooves. The grooves 55 extend inward on the lock nut 5 over the outer cylindrical segment 54 and the conical segment 52, where it is terminated by a circular arc.

At the inner end thereof, the lock nut has a chamfering 63.

Thus, the outer contour of the lock nut has a first portion 51 that consists of the continuously cylindrical surface 51, including the chamfering 63. The conical segment 52, the transition segment 53 and the cylindrical segment 54 form a second portion, the rotationally symmetrical contour of which is broken by the grooves 55.

On the inside, at the inner end thereof, the lock nut has a threaded segment 57, then a short cylindrical segment 58, and a flange 59 thereoutside.

On the inwardly facing side thereof, the flange 59 has a planar radial surface 60, and on the outwardly facing side thereof, a conical surface 62, constituting a guide surface for the male coupling unit with which the female coupling unit 3 is intended to be interconnected.

In the example shown, the lock nut has S an outer diameter of 59 mm and the outer cylindrical segment 54 a diameter of 55 mm. The thread 57 is M 48×1.5 and the inner diameter of the flange is 40 mm. Each groove has an inner diameter of 51 mm, which implies that the groove depth is 2 mm at the outer cylindrical segment in order to increase up to 9 mm at the inner end of the transition segment 52. The axial extension of the lock nut 5 is 18 mm and each groove 55 has a length of approx. 11 mm. The height of the thread 57 is 10.5 mm and the axial extension of the guide surface 62 is 5.5 mm. The angle of the same to the axial direction is 38°.

Figure 6:
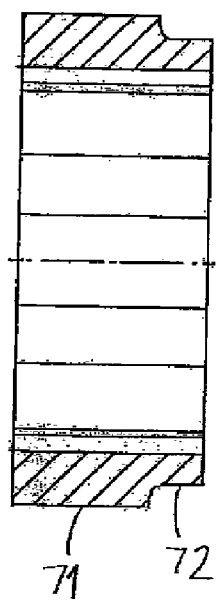
FIG. 6 is an axial section through a mounting tool according to the invention.
Figure 7:
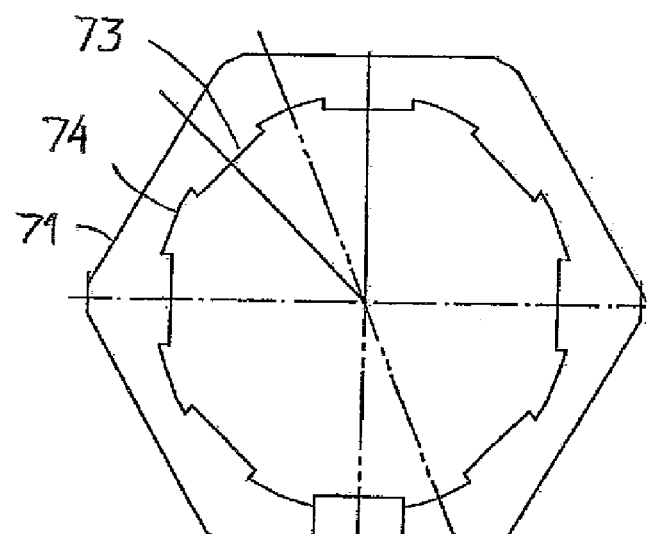
FIG. 7 is an end view from the right of the mounting tool of FIG. 6.
Figure 8:
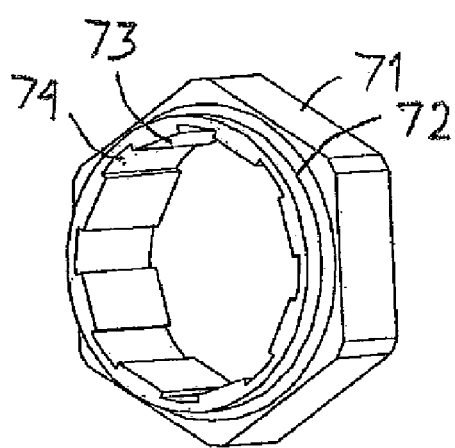
FIG. 8 is a perspective view of the mounting tool in FIGS. 6 and 7.

In FIGS. 6-8, there is seen how the mounting tool is designed. On the outside, it has essentially the contour of a hexagonal nut 7 having a shorter axially cylindrical segment 72. On the inside, the tool is provided with eight protuberances 73 having intermediate grooves 74. The protuberances 73 have the shape and profile that correspond to the ones of the grooves 55 in the lock nut 5 to be able to engage the same.

The tool 5 has an axial extension of 25 mm, the cylindrical segment of which occupies 7 mm. The width of the hexagon 71 is 65 mm and the diameter of the cylindrical segment is 59 mm.

In connection with FIG. 1, it was generally described how the female coupling unit 3 is mounted to the holder block 1. Now, the tightening step is described closer, where accordingly the thread 57 of the lock nut is brought into engagement with the thread 33 of the coupling unit 3 that projects at the front side 15 of the holder block 1. As is seen in FIG. 1, the holes 11 of the holder block 1 for the coupling units to be mounted are situated so close to each other that there is no space to tighten the respective lock nut 5 by means of a torque wrench.

Therefore, when a lock nut 5 is to be tightened onto the coupling unit 3, this is effected by means of the mounting tool 7 described in connection with FIGS. 6-8. In doing so, the mounting tool 7 is threaded onto the lock ring axially with the cylindrical segment 72 of the tool 7 facing the lock nut 5 so that the protuberances 73 of the tool 7 engage the grooves 55 of the lock nut 5, whereby a rotationally fixed connection is established. The mounting tool is then turned by means of a torque wrench, the lock nut 5 being tightened onto the thread 33 at the nose end 31 of the coupling unit 3. By virtue of the mounting tool 7, the grip for a torque wrench is moved out axially a distance from the proper threaded joint 57, 33, which creates the requisite space to gain access for the torque wrench.

When a male coupling unit is to be interconnected with the mounted female coupling unit 3, i.e., be inserted axially from the right in FIG. 3, the conical guide surface 62 serves as a guiding-in for the nose part of the male coupling units so that this becomes centered.

What is claimed is:

1. A hydraulic coupling device comprising:
   a coupling unit;
   a holder block to which said coupling unit is mounted in a through hole arranged in said holder block;
   a lock nut for securing said coupling unit to said holder block, said lock nut having a cylindrically symmetrical outer contour and having one end surface facing toward said holder block and one end surface facing away from said holder block;
   a hose-connection end on said coupling unit for connection to a hydraulic hose; and
   a nose end on said coupling unit for interconnection with a complementary coupling unit, said nose end being provided with an external thread for cooperation with said lock nut, so that said lock nut, in the mounted position, secures the coupling unit to said holder block;
   said lock nut having a plurality of grooves distributed around the circumference of said cylindrically symmetrical outer contour, said grooves being recessed and extending axially inward from the end surface of said lock nut facing away from said holder block, wherein the axial extension of each said groove is smaller than 70% and greater than 50% of the total axial extension of said lock nut, said lock nut further having internal threads extending from the end surface of said lock nut facing toward said holder block, wherein the axial extension of said internal threads is smaller than 60% and greater than 30% of the total axial extension of said lock nut.

2. The hydraulic coupling device according to claim 1, wherein the number of said grooves is 4 to 10.

3. The hydraulic coupling device according to claim 1, wherein said coupling unit is formed as a female coupling unit, said lock nut being formed with a hole portion at the end surface facing away from said holder block, said hole portion having a decreasing diameter from said end surface and inward, the wall of the hole in the same hole portion forming a guide surface for a complementary male coupling unit.

4. The hydraulic coupling device according to claim 3, wherein said guide surface has a conical shape.

5. The hydraulic coupling device according to claim 4, wherein said guide surface forms an angle with the axial direction that is in the interval of 30-50°.

6. The hydraulic coupling device according to claim 5, wherein the interval is 35-40°.

* * * * *